March 26, 1968

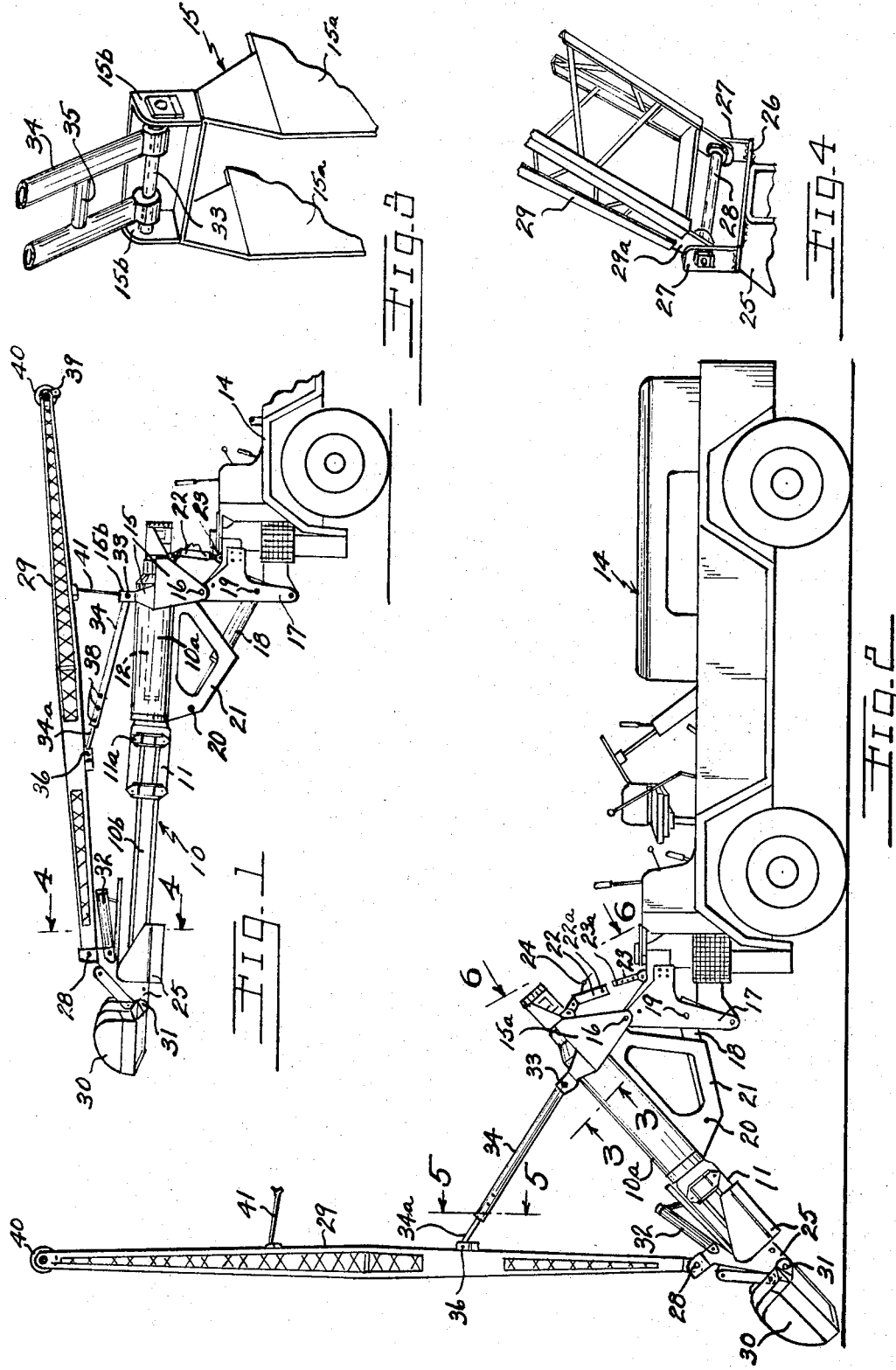

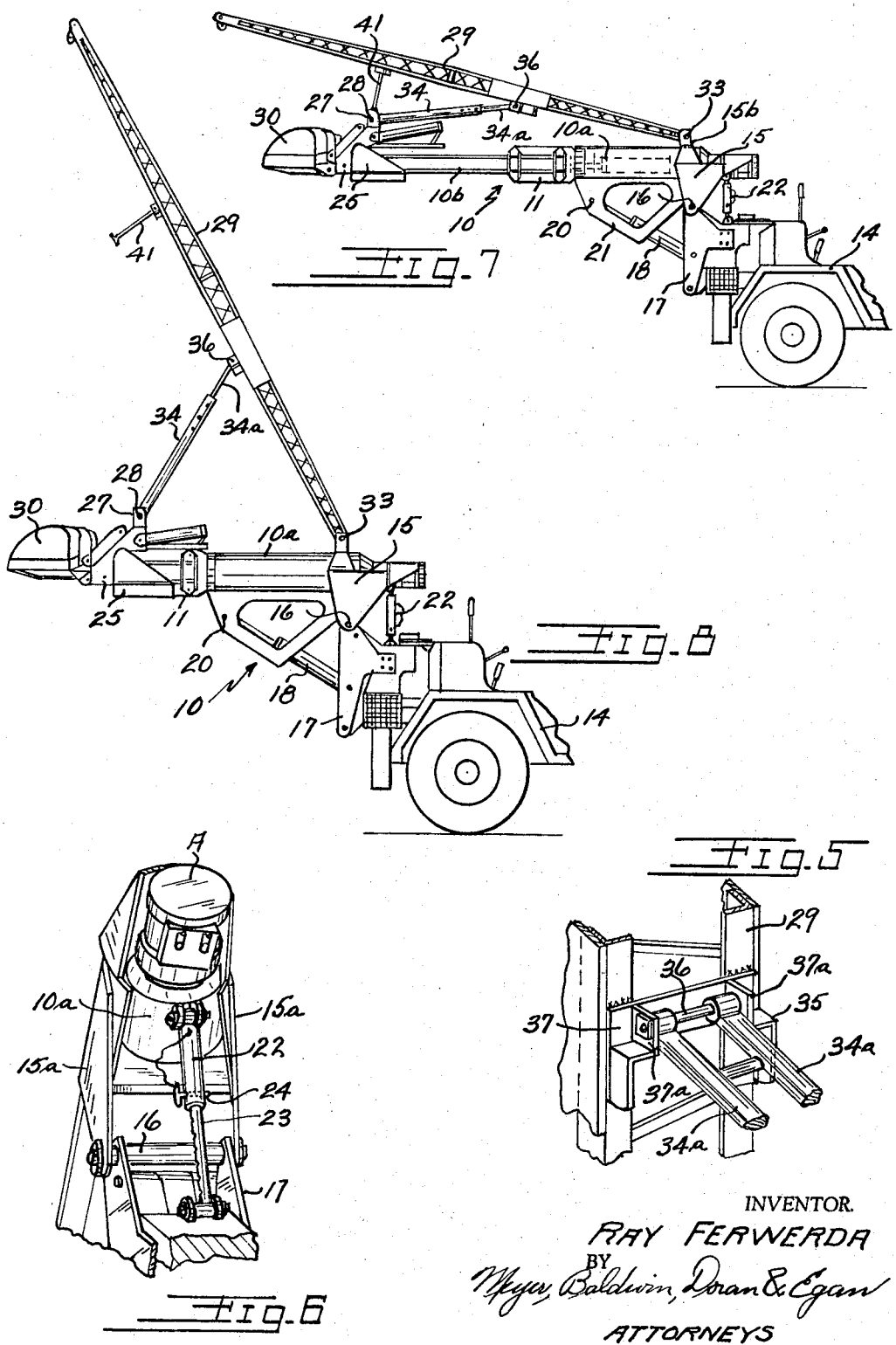

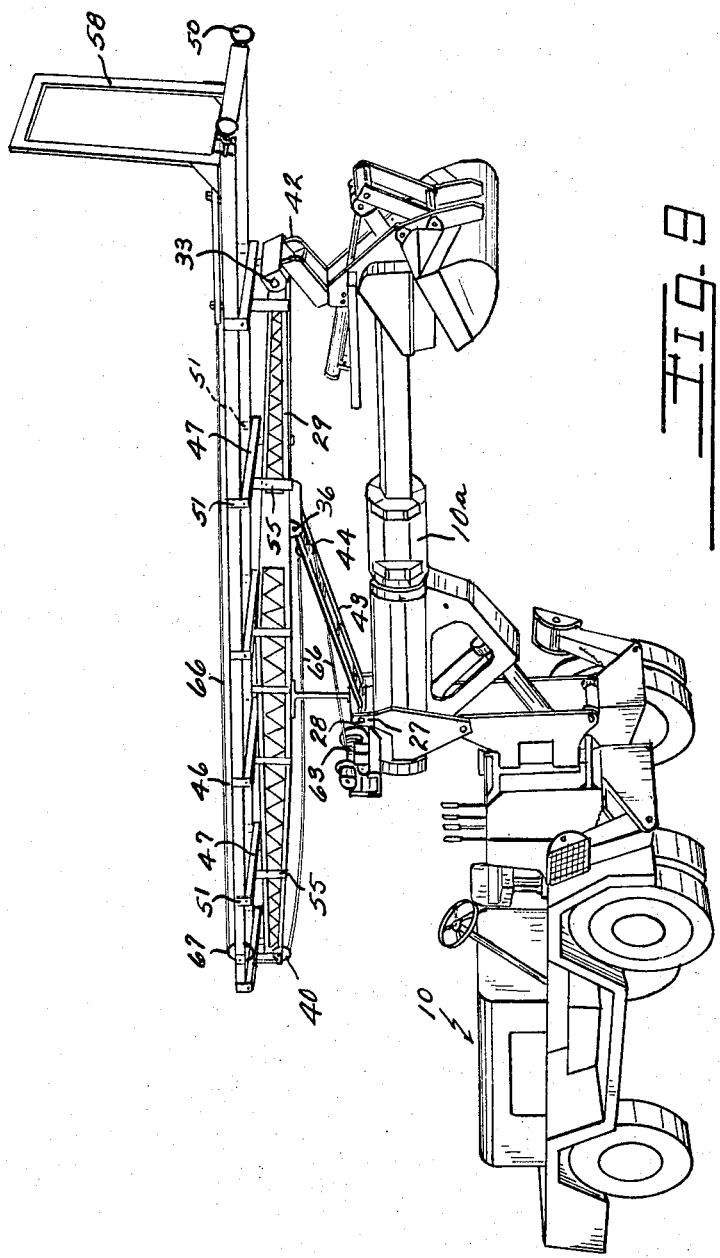

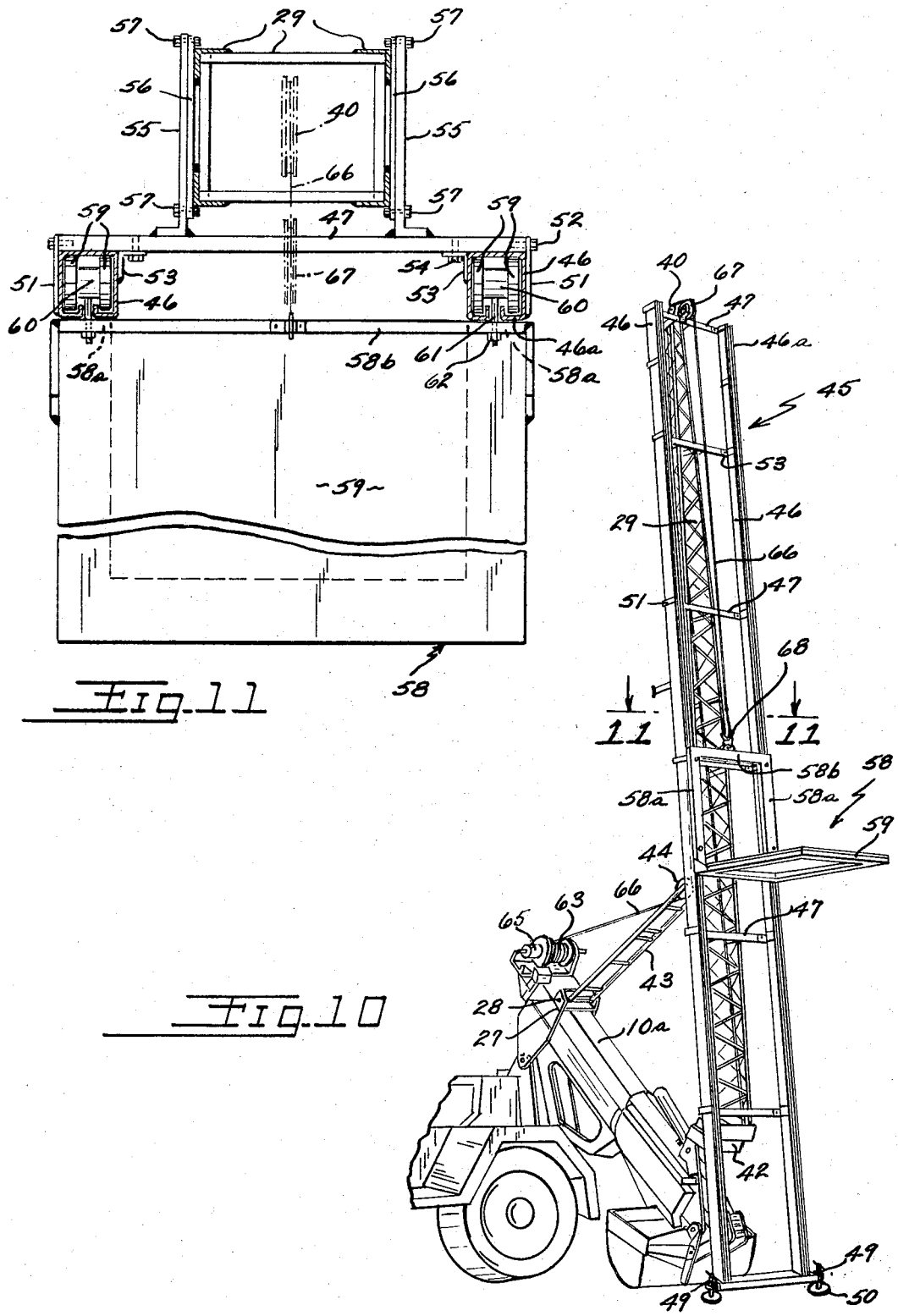

R. FERWERDA 3,374,909

COACTING BOOM STRUCTURE

Filed April 24, 1964

INVENTOR.
RAY FERWERDA
BY
Meyer, Baldwin, Doran & Egan
ATTORNEYS

United States Patent Office 3,374,909
Patented Mar. 26, 1968

3,374,909
COACTING BOOM STRUCTURE
Ray Ferwerda 1050 NW. 163rd Drive,
North Miami, Fla. 33169
Filed Apr. 24, 1964, Ser. No. 362,331
12 Claims. (Cl. 214—671)

This invention relates to improvements in coacting boom structures including a telescoping boom and a rigid boom, the latter being so connected to the telescoping boom that the telescoping action of that boom raises and lowers the rigid boom.

One of the objects of the present invention is to provide such a telescoping boom having a fixed boom section and a movable boom section slidably mounted in the fixed section for movement longitudinally retracted into and extended out of the fixed section. The coacting rigid boom has an end pivot connection and an intermediate pivot connection between the ends of the rigid boom and spaced a predetermined distance from the end pivot connection. An operative member connecting the two booms comprises a rigid strut shorter than the telescopic boom in its extended condition, the strut having end pivot connections at each end whereby it may be operatively connected between the telescoping boom and the rigid boom. Two pivot mountings are provided, one on the movable boom section of the telescoping boom and another pivot mounting fixed relative to the fixed boom section of the telescoping boom. One end pivot connection of the rigid strut is pivotally connected to the rigid boom intermediate pivot connection. The other of the strut end pivot connections and the end pivot connection of the rigid boom are interchangeably connectable to either of the pivot mountings fixed relative to one or the other of the moving sections of the telescoping boom. Thus, with the rigid boom end pivot connection pivotally connected to either one of the pivot mountings, and the other of the strut end pivot connections pivotally connected to the other of the pivot mountings, then the retraction and extension of the telescoping boom will cause oscillation of the rigid boom about its end pivot connection.

Another novel feature of this invention is the provision of identical pivot pins in the two pivot mountings so that the lower end of the rigid boom, as well as one end of the rigid strut, may be transferred from one pivot mounting to the other with a minimum of difficulty and elapsed time.

Other objects and advantages of this invention will be apparent from the accompanying drawings and description and the essential features thereof will be set forth in the appended claims.

In the drawings,

FIG. 1 is a side elevational view of the coacting booms of this invention with the rigid boom pivotally connected to the movable section of the telescoping boom and with the rigid boom in near-horizontal carrying position;

FIG. 2 is a side elevational view of the same with the rigid boom in raised position;

FIG. 3 is an enlarged fragmental perspective view taken along the line 3—3 of FIG. 2;

FIG. 4 is a fragmental perspective view taken along the line 4—4 of FIG. 1;

FIGS. 5 and 6 are enlarged fragmental perspective views taken along similarly numbered lines of FIG. 2;

FIG. 7 is a side elevational view similar to FIG. 1 but with the lower end of the rigid boom pivotally connected to a point fixed relative to the fixed section of the telescoping boom and with the rigid boom in a near-horizontal position;

FIG. 8 is a side elevational view showing the arrangement of FIG. 7 but with the rigid boom in elevated position;

Figure 12:
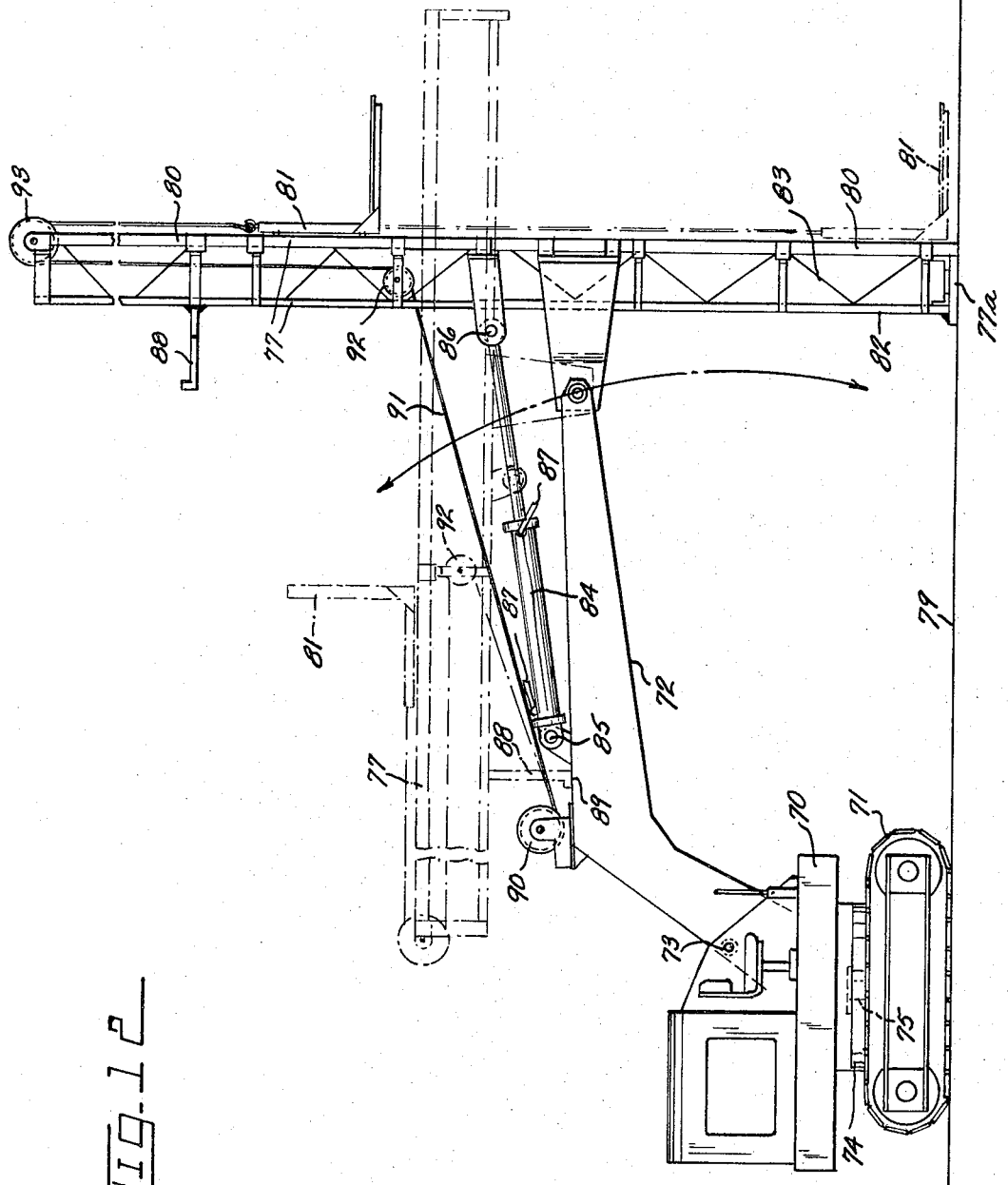

FIGS. 9, 10 and 11 show a modification of the coacting boom structure showing how a rigid track frame may be held in substantially vertical position by the telescopic boom, FIG. 9 showing a rigid boom and attached track frame in generally horizontal carrying position, FIG. 10 showing the same in generally vertical position for use, and FIG. 11 being a transverse sectional view, enlarged, taken along the line 11—11 of FIG. 10; while FIG. 12 is a side elevational view of another modification.

This invention may utilize various types of telescoping booms but is shown herewith as applied to a boom 10 having a fixed boom section 10a and a movable boom section 10b which is slidably mounted in the fixed section for longitudinal extension and retraction. The mounting here disclosed comprises a housing 11 rigidly attached to the fixed section 10a and carrying suitably mounted rollers 11a which engage the movable boom section 10b for substantially frictionless longitudinal movement. The section 10b is noncircular so that it does not rotate about its own axis. Means is provided for telescoping the boom 10 and in the form here shown this comprises a cylinder 12 extending lengthwise of the boom section 10a substantially in the center thereof and operating a coacting piston and piston rod 13 connected with the boom section 10b. Means is provided for introducing pressure fluid on opposite sides of the piston connected with the rod 13 for moving the piston longitudinally backward and forward in the cylinder 12.

Means is provided for movably mounting the telescoping boom on a base, such as the vehicle 14 or other suitable base. The means here shown comprises a generally U-shape carriage 15 embracing and fixed to the boom section 10a by means not shown. This carriage has parallel wide wings 15a as clearly shown in FIGS. 3 and 6 which are connected by a pivot pin 16 with a bracket 17 which is rigidly secured to the vehicle 14. For tilting the telescopic boom about the pivot 16, a cylinder and piston motor 18 is connected to the bracket 17 at 19 so as to pivot about the pivot point 19 and with the other end of the cylinder and piston motor pivotally connected at 20 to a cradle 21 which is rigidly connected to the underside of the boom section 10a. Means, not shown, is provided for causing expansion and contraction of the motor 18 so as to cause the fixed boom section 10a to tilt about the pivot point 16.

Preferably, but not necessarily, means is provided for fixing the boom section 10a so as to prevent tilting about the pivot pin 16 when desired. This herein takes the form of a hollow sleeve 22 pivotally connected to the rear end of the boom section 10a and adapted to receive within itself a rod 23 which is pivotally connected to a portion fixed with reference to the vehicle 14. A removable pin 24 may be passed through suitable openings in the parts 22 and 23 so as to hold them secured together in one of several adjusted positions.

The outer end of the movable boom section 10b is provided with means for mounting the lower end of a coacting rigid boom as taught by this invention. Herein is shown a bracket 25 rigidly connected to the end of the boom section 10b. To the upper side of this bracket 25 is affixed a plate 26 as seen in FIG. 4 which supports a pair of upstanding ears 27 adapted to receive a pivot pin 28 to provide a pivot mounting for the lower end of the rigid boom 29. The pin passes through the members 27 and through a pair of ears 29a which are rigid with the boom 29.

For other useful application of the telescoping boom, means may be provided for mounting a tool at the outer end of the movable boom section 10b. Here shown is a scoop bucket 30 pivotally mounted at 31 on the bracket 25 and oscillatable by means of a cylinder and piston motor 32 carried by the bracket 25 and operatively connected with the bucket 30 by known means not necessary to be described here.

Another pivot mounting capable of receiving the lower end of the rigid boom 29 is rigidly connected to the upper portion of the member 15 previously described. Here, a pair of upstanding ears 15b are adapted to receive a pivot pin 33 which preferably, but not necessary, is identical with the pivot pin 16 previously described.

A rigid strut is shown at 34 for the purpose of elevating the rigid boom 29 by operation of the telescoping boom. The strut may take any one of various forms but is here shown as comprising a couple of parallel hollow bars rigidly connected by several cross bars 35. One end of the strut is pivotally connected to the pivot mounting 15b by means of the pivot pin 33 as shown in FIG. 3. The other end of the strut is pivotally mounted to an intermediate portion of the rigid boom 29 by a pivot pin 36 as shown in FIGS. 1 and 5. A suitable plate 37 is welded to the underside of the boom 29 and provides a couple of ears 37a to receive the pivot pin 36 which passes through eyes at the ends of the rods 34a. The purpose of the hollow tubular rods 34 and the solid rods 34a of smaller diameter is to provide an adjustment for the length of the strut 34 as indicated in FIG. 1. A plurality of through openings 38 are provided in the members 34 and 34a so that the members 34a may enter longitudinally into the hollow members 34 by different distances so as to adjust the total length of the strut. This strut need not be adjustable but it is often desirable.

The rigid boom 29 might take one of several forms. There is shown here a common form of hollow boom with longitudinal corner pieces and cross bracings of a standard character. It should be understood that by the use of the term "rigid boom" in the specification and claims hereof, I intend to include any rigid member connected as shown which might include tracks movable to a vertical position and adapted to carry a workman or building materials upward and downward on tracks carried by the rigid boom.

The boom 29 may carry means at its upper end or else where for connecting a load to the boom. For instance, a link is indicated at 39 for attaching a rope or cable or the like to suspend a load to be lifted by movement of the boom from the position of FIG. 1 to FIG. 2, or from the position of FIG. 7 to FIG. 8. Likewise, one or more pulleys or sheaves 40 might be rotatably mounted at the outer end of the boom over which a cable could be run in the usual fashion for manipulation of a load.

Preferably, but not necessarily, a stop member 41 may be connected to the rigid boom to limit its downward movement in the position of FIG. 1 whereby the stop member 41 rests upon a suitable portion of the equipment underneath it.

All of the equipment just described is shown in FIGS. 7 and 8, the only difference being the rigid boom is now connected to the pivot mounting 15b by the pivot pin 33 and the strut 34 is connected to the pivot mounting 27 by means of the pivot pin 28. The other end of the strut is connected to the rigid boom by the pivot pin 36.

The operation of this device should now be obvious. With the parts connected as shown in FIGS. 1 and 2 the telescoping boom may be extended as shown in FIG. 1 to cause the rigid boom 29 to lie in a near-horizontal position for carrying purposes, etc. In FIG. 2 the telescoping boom has been retracted which causes the strut 34 to move the rigid boom 29 to a raised position oscillating about its pivot 28. To place the boom 29 in the vertical position of FIG. 2, the telescoping boom has been oscillated about its pivotal mounting 16 by means of the motor 18. This position may be supported by resting the digging tool 30 on the ground or the members 22 and 23 may be arranged to rigidly support the telescoping boom in the desired position. Those skilled in the art will understand that the telescoping boom could be held horizontal as in FIG. 1 and operated in a retracted direction to raise the rigid boom 29 which could be made to assume a vertical position by properly adjusting the length of the strut 34.

In FIGS. 7 and 8, the lower end of boom 29 has merely been moved from pivot pin 28 to pivot pin 33 while the strut 34 has been moved in the opposite direction from pivot pin 33 to pivot pin 28. With the telescoping boom 10 in its extended position as shown in FIG. 7, the rigid boom 29 is in its lowered position. When the telescoping boom is retracted as shown in FIG. 8, then the strut 34 causes the rigid boom 29 to be elevated about its pivot mounting 33.

In FIGS. 9, 10 and 11, there is shown a modification whereby a rigid track frame may be moved between a generally horizontal carrying position in FIG. 9 to a generally vertical position in use in FIG. 10. Referring to these two figures and the more detailed sectional view in FIG. 11, the rigid boom 29 is shown in a position similar to that of FIGS. 7 and 8 where one end is connected by pivot pin 33 to a bracket 42 which is slightly different than the bracket 15b for the purpose of permitting the movement of the parts to the position shown in FIG. 10. The strut 43 is similar to the strut 34 and is pivotally connected to bracket 27 by pivot pin 28. The opposite end of the strut is connected by pivot pin 36 to the rigid boom 29 at a point spaced from the pivot pin 33. The strut 43 has two parallel side members and between them at a point near the pivot end 36 is rotatably supported a sheave 44 midway between the parallel side members of the strut, for a purpose later to be described.

A rigid track frame 45 is detachably connected to the rigid boom 29 so as to be raised and lowered when the rigid boom moves between horizontal and vertical positions. This track frame comprises two parallel side tracks 46 spaced so as to lie on opposite sides of the rigid boom 29 when in the position shown in FIGS. 9, 10 and 11. Straps 47 spaced along the length of the frame are rigidly connected between the tracks 46 so as to provide a solid construction. A foot piece 48 connects the tracks at their lower end as seen in FIG. 10 and may be provided with leveling means as shown there. To this end, screw members 49 are threaded through the foot piece 48 and provided at their bottoms with bearing plates 50 to rest upon the ground or other surface. Obviously, by adjusting the screw means 49 on opposite sides of the track frame it may be supported levelly and firmly on an uneven surface.

Referring to FIG. 11, a crosstie member 47 is shown connected to tracks 46 by a plate 51 welded to the outer side of the track and bolted at 52 into the tie member 47. On the inside of the track an angle iron 53 bolted to the tie member at 54 serves to hold the track in place. In the intermediate portion of each tie member 47 and on the side opposite the tracks 46, angle plates 55, spaced apart and parallel to each other, are welded to the tie member 47. Boom 29 has welded to it the plates 56 opposite the angle plates 55 and the angle plates are then bolted to the plates 56 and thus to the rigid boom 29 by means of the bolts 57. Thus, the bolts 57 are the only means by which the rigid track frame is finally held in position with respect to the rigid boom 29 and thus the rigid track frame is detachably connected whenever desired.

For making use of the track 46 in its generally vertical position as shown in FIG. 10, it is usually necessary to provide a carriage such as that shown at 58 adapted to travel up and down the tracks 46. The track here shown is provided with a platform 59 at right angles to the main carriage so that a workman or loads may be carried up and down. It will be understood by those skilled in this art that the carriage 58 might support a head for driving piling or any other device desired to be carried up and down the tracks 46 by means of the carriage similar to 58.

Referring to FIG. 11, there are two parallel side members 58a which are rigid parts of the carriage and each of these is provided at the top and bottom with means for holding the carriage to the track 46 and for rolling movement along the track. In the form shown, each connection comprises a pair of parallel rollers 59 adapted to fit fairly snugly in the channel form of the track 46 as seen in FIG. 11. These two rollers are mounted on a common axle 60 which is provided with a rigid pin 61 passing through a suitable opening in the side member 58a and held in place by a suitable nut 62. It will be noted that the side flanges of the track members 46 are each bent generally U-shape as indicated at 46a leaving a space between them running the entire length of the track to accommodate the pin 61 as it travels along the tracks with movement of the carriage.

Suitable means is provided for causing movement of the carriage up and down the tracks 46 in the position of FIG. 10. This means here shown comprises a hoist drum 63 mounted in suitable brackets 64 rigidly connected to the main boom section 10a. Suitable power means is indicated at 65 for causing rotation of the hoisting drum. In this form it is an hydraulic motor supplied by suitable hydraulic pressure lines not shown but the same could be an electric motor or an internal combustion engine, if desired.

A cable 66 is wound around the drum 63 and then passed over sheave 44 carried by the strut 43, then the cable passes upwardly and over the pulley sheave 40 mounted on the outer end of the rigid boom 29, then over a pulley sheave 67 rotatably mounted on the top cross piece 47 of the rigid track frame, and then the cable 66 passes downwardly for attachment at 68 to the top frame member 58b of the carriage 58. Obviously, by operation of the hoisting drum 63 in opposite directions, the carriage 58 may be caused to travel upwardly and downwardly on the frame 45 in the generally vertical position in FIG. 10.

Other parts of the machine shown in FIGS. 9, 10 and 11 are similar to those first described and are given the same reference characters.

It is obvious that the power driven hoist 63 may be utilized with the boom 29 and the pulley or sheave 40 by running a cable from the hoist drum over the sheave 40 and hanging free from the end of the boom 29 to lift a load, if desired, in the apparatus shown in FIGS. 1 to 8.

A further embodiment of this invention is shown in FIG. 12. Here a vehicle 70 mounted on a crawler track 71 or otherwise on wheels as desired carries a boom 72 pivotally mounted on the vehicle at 73 for oscillation about the pivot by power means not shown. Preferably also the bed of the vehicle is rotatably mounted on the crawler track 71 by a turntable 74 rotatable about a vertical axis 75 by power means not shown. In this manner the boom 72 may be manipulated to any desirable point. Pivotally mounted on the outer end of the boom 72 on a horizontal pivot 76 is a rigid track frame 77 similar to that shown in FIGS. 9, 10 and 11 but with differences which will be pointed out. Rigid with the track frame are a pair of parallel brackets 78 for attaching the rigid track frame to the boom 72 for oscillating motion about the pivot. The arrangement of the brackets 78 and the length of the rigid track frame as seen in vertical position in FIG. 12 is such that in the vertical position shown the bottom of the frame at 77a rests on the surface 79 which is substantially coplanar with that upon which the vehicle 70 travels.

The portion of the rigid track frame 77 seen toward the right in FIG. 12 is identical with the same parts shown in FIGS. 9, 10 and 11 and comprises two rigid tracks 80 parallel to each other and generally of U-form and adapted to support a carriage 81 for travel along the frame in exactly the manner of the suspension of the carriage 58 shown in FIG. 11. The track frame 77 is useful in the vertical position of FIG. 12 only if it is strong enough as a beam or column to support loads. To this end, a truss structure is indicated wherein parallel trusses are provided associated with each of the tracks 80 wherein the track 80 is one chord of the truss, the other chord is indicated at 82 and bracing at 83.

Power means is provided for moving the rigid track frame 77 between the substantially vertical and substantially horizontal positions. In FIG. 12, this comprises an hydraulic jack 84 pivotally mounted at 85 on the boom 72 and having a piston rod pivotally connected at 86 with a point on the track frame spaced from the pivot 76 so that operation of the hydraulic jack 84 by pressure fluid in the lines 87 is adapted to move the rigid track frame from the full line substantially vertical position of FIG. 12 to the dot-dash substantially horizontal position. A stop member 88 on the rigid track frame engages against the boom 72 at 89 to prevent damage to parts of the hydraulic jack and the boom 72 when the rigid frame is moved to the horizontal position.

Means is provided for moving the carriage 81 up and down on the rigid track frame. In FIG. 12 this provides a power driven hydraulic winch 90 mounted on the rear end of the boom 72 and connected with carriage 81 by a cable 91 passing over sheaves 92 and 93 carried by the rigid track frame.

In one use of the boom 72 a dipper stick for a shovel is pivotally mounted at 76 and manipulated by the hydraulic jack 84. By my invention such a vehicle is quickly transformed by disconnecting the dipper stick and attaching the rigid frame 77.

What is claimed is:

1. Coacting boom structures comprising a telescoping boom having a fixed boom section and a movable boom section slidably mounted in said fixed section for movement longitudinally retracted into and extended out of said fixed section, means for retracting and extending said boom, a rigid boom having an end pivot connection and an intermediate pivot connection intermediate the ends of said rigid boom and spaced a predetermined distance from said end pivot connection, a rigid strut shorter than said telescoping boom extended and having end pivot connections at its opposite ends, a pivot mounting fixed relative to said fixed boom section, a pivot mounting on said movable boom section, one end pivot connection of said strut adapted to pivotally coact with said rigid boom intermediate pivot connection, and said rigid boom end pivot connection and the other of said strut end pivot connection being interchangeably connectable to either of said pivot mountings, whereby, with said rigid boom end pivot connection pivotally connected to either one of said pivot mountings and the other of said strut end pivot connections pivotally connected to the other of said pivot mountings, retraction and extension of said telescoping boom will cause oscillation of said rigid boom about its end pivot connection.

2. Coacting boom structures as defined in claim 1 wherein identical pivot pins connect said rigid boom end pivot connection and said other of said strut end pivot connections to at least one of said pivot mountings.

3. Coacting boom structures as defined in claim 1 wherein the length of said strut plus said predetermined distance is only slightly greater than the distance between said pivotal mountings, whereby said rigid boom may lie almost parallel to said telescoping boom when the latter is extended.

4. Coacting boom structures as defined in claim 1 including means for adjusting the length of said strut.

5. Coacting boom structures as defined in claim 1 including means for movably mounting said fixed boom section on a base.

6. The combination of claim 5 wherein said last named means includes means for locking the position of said fixed boom section relative to said base.

7. Coacting boom structures as defined in claim 1 including means on said rigid boom outwardly of said intermediate pivot connection for connecting a load to said rigid boom.

8. Coacting boom structures as defined in claim 1 including means for attaching a tool to said movable boom section.

9. Coacting structures comprising a telescoping boom having a fixed boom section and a movable boom section slidably mounted in said fixed section for movement longitudinally retracted into and extended out of said fixed section, means for retracting and extending said movable boom section, a pivot mounting fixed relative to said fixed boom section, a pivot mounting on said movable boom section, a rigid track frame having an end pivot connection and an intermediate pivot connection intermediate the ends of said rigid track frame and spaced from said end pivot connection, a rigid strut of fixed length having end pivot connections at its opposite ends connected respectively with said first named pivot mounting and with said track frame intermediate pivot connection, and said rigid track frame end pivot connection being connected to said pivot mounting on said movable boom section, whereby retraction and extension of said telescoping boom will cause oscillation of said rigid track frame about its end pivot connection between a generally vertical and a generally horizontal position, track means forming part of said track frame, and a carriage movable along said track means, power means on said fixed boom section, and means operatively connecting said power means with said carriage for moving the carriage along said track means, a sheave rotatably mounted on said strut, a sheave rotatably mounted on the outer end of said track frame, and said last named means includes a cable passing over both said sheaves.

10. Coacting boom structures as defined in claim 1 including a sheave rotatably mounted at the outer end of said rigid boom, and power means on said fixed boom section including a hoist drum, whereby a cable may be wound around said drum and passed over said sheave to manipulate a load.

11. Coacting boom structures as defined in claim 1 including a rigid track frame adapted to be detachably connected to said rigid boom and generally parallel thereto, and track means forming part of said track frame, whereby retraction and extension of said telescoping boom will cause oscillation of said track frame about its end pivot connection between a generally vertical and a generally horizontal position.

12. Coacting boom structures as defined in claim 11 including a carriage mounted on said track means for movement therealong, power means on said fixed boom section, and means operatively connecting said power means with said carriage for moving the carriage along said track means.

References Cited
UNITED STATES PATENTS

| | | | |
|---|---|---|---|
| 284,234 | 9/1883 | Reeves | 198—233 |
| 1,005,398 | 10/1911 | Wooster | 198—233 |
| 2,106,878 | 2/1938 | Sinclair | 187—9 |
| 2,646,182 | 7/1953 | Maas | 214—673 |
| 2,786,580 | 3/1957 | Balogh | 212—8 |
| 2,797,009 | 6/1957 | Cutler | 214—672 |
| 3,088,545 | 5/1963 | Meyer | 187—6 |
| 3,197,036 | 7/1965 | Mason | 214—8 |

GERALD M. FORLENZA, *Primary Examiner.*

R. B. JOHNSON, *Assistant Examiner.*